United States Patent
Ozawa et al.

(10) Patent No.: US 7,262,953 B2
(45) Date of Patent: Aug. 28, 2007

(54) ELECTROLYTIC CAPACITOR

(75) Inventors: Masashi Ozawa, Tokyo (JP);
Masayuki Takeda, Ibaraki (JP);
Makoto Ue, Ibaraki (JP)

(73) Assignees: Nippon Chemi-Con Corporation,
Tokyo (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/534,184

(22) PCT Filed: Nov. 7, 2003

(86) PCT No.: PCT/JP03/14215

§ 371 (c)(1),
(2), (4) Date: Oct. 13, 2005

(87) PCT Pub. No.: WO2004/042756

PCT Pub. Date: May 21, 2004

(65) Prior Publication Data
US 2006/0098384 A1    May 11, 2006

(30) Foreign Application Priority Data

Nov. 8, 2002  (JP) .............................. 2002-326007
Nov. 8, 2002  (JP) .............................. 2002-326009
Nov. 8, 2002  (JP) .............................. 2002-326019
Nov. 8, 2002  (JP) .............................. 2002-326028

(51) Int. Cl.
*H01G 9/00*   (2006.01)
*H01G 4/228*  (2006.01)

(52) U.S. Cl. ...................... 361/503; 361/520
(58) Field of Classification Search ........ 361/503–505, 361/508, 517–520, 511
See application file for complete search history.

(56) References Cited

U.S. PATENT DOCUMENTS

| RE31,743 | E   | * | 11/1984 | Arora et al. ............... 205/139 |
| 6,262,879 | B1 | * | 7/2001  | Nitta et al. ............... 361/517 |
| 7,072,173 | B2 | * | 7/2006  | Takeda et al. ............ 361/523 |
| 2004/0095708 | A1 | * | 5/2004 | Takeda et al. ............ 361/504 |

FOREIGN PATENT DOCUMENTS

| JP | 11067600   |   | 3/1999 |
| JP | 11067600 A | * | 3/1999 |
| JP | 2000299257 |   | 10/2000 |
| JP | 2001102265 A | * | 4/2001 |

* cited by examiner

*Primary Examiner*—Eric W. Thomas
(74) *Attorney, Agent, or Firm*—Hahn Loeser & Parks, LLP; John J. Cunniff

(57) ABSTRACT

An electrolytic capacitor having a low impedance characteristic, having a high withstand voltage characteristic of 100V class, wherein the electrolytic capacitor provides an excellent high temperature life characteristic and an excellent leakage characteristic.

The electrolyte solution containing the aluminum tetrafluoride salt is used. The electrolytic capacitor of the present invention has a low impedance characteristic, a high withstand voltage characteristic, and an excellent high temperature life characteristic. Moreover, the aforementioned electrolyte solution is used, and a foil showing noble potential at least in the electrolyte solution than the electrode potential of the cathode tab, or a cathode electrode foil subjected to chemical treatment is used as the cathode electrode foil, so as to obtain an excellent leakage characteristic.

9 Claims, 2 Drawing Sheets

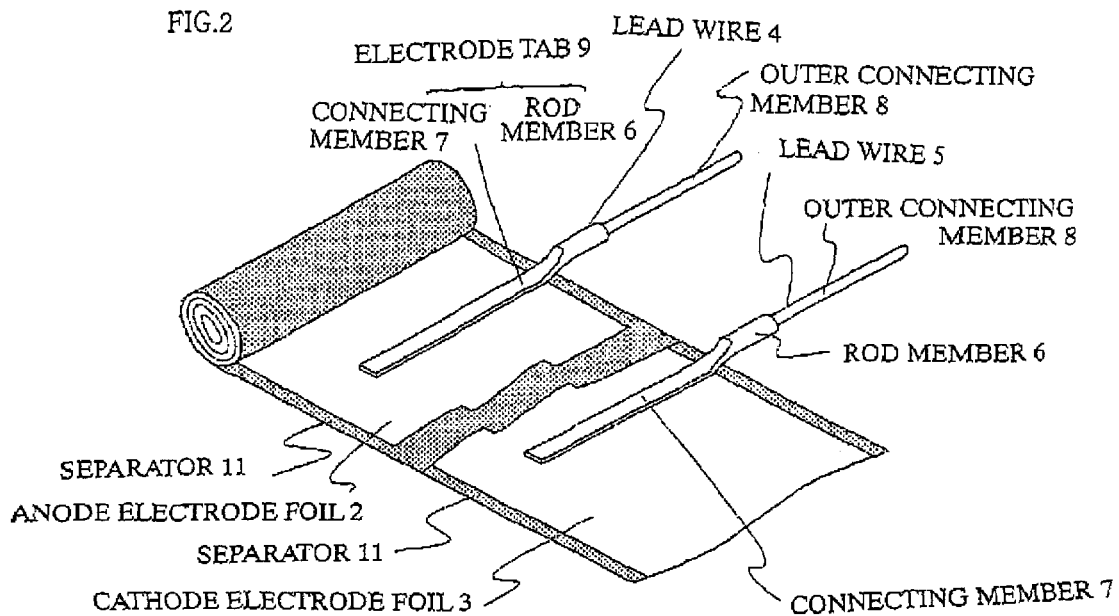

ELECTROLYTIC CAPACITOR

FIELD OF THE INVENTION

The present invention relates to an electrolytic capacitor, especially, the electrolytic capacitor having a low impedance characteristic and a high withstand voltage characteristic.

BACKGROUND OF THE INVENTION

An electrolytic capacitor typically has such a structure shown in FIG. 1. That is, an anode electrode foil 2 is made of a band-shaped high purity aluminum foil where the effective aluminum foil surface has been enlarged through etching process chemically or electrochemically, and an oxide film is formed on the surface, through a chemical process of treating the aluminum foil with a chemical solution such as ammonium borate aqueous solution and the like. A cathode electrode foil 3 is also made of an etched aluminum foil of high purity. Capacitor element 1 is formed by the anode electrode foil 2 and the cathode electrode foil 3, wound together with intervening separator 11 made of manila paper and the like. Next, the capacitor element 1, after impregnating with electrolyte solution for driving the electrolytic capacitors, is housed into a bottomed outer case 10 made of aluminum and the like. The outer case 10 is equipped at the opening with a sealing member 12 made of an elastic rubber, and is sealed by drawing.

The anode electrode foil 2 and the cathode electrode foil 3 are each connected to lead wires 4 and 5, employed as electrode leading means to lead the electrodes, by means of stitching, ultrasonic welding, and the like, as shown in FIG. 2. Each of the lead wires 4 and 5 employed as electrode leading means is comprised of an electrode tab 9 made of aluminum including a rod member 6, a connecting member 7 that comes into contact with each of the electrode foils 2 and 3, and an outside connecting member 8 made of solderable metal which has been fixed at the tip of the rod member 6.

Herewith, as electrolyte solution for driving the electrolytic capacitor having high conductivity, and to be impregnated to the capacitor element, wherein γ-butyrolactone is employed as the main solvent composed of quaternized cyclic amidin compounds (imidazolinium cation and imidazolium cation) as the cationic component and acid conjugated bases as the anionic component are dissolved therein as the solute (refer to Unexamined Published Japanese Patent Application No. H08-321449 and No. H08-321441)

However, due to the remarkable development of digital information devices in recent years, the high-speed driving frequency of micro-processor which is a heart of these electronic information devices is in progress. Accompanied by the increase in the power consumption of electronic components in the peripheral circuits, the ripple current is increased abnormally, and there is a strong demand for the electrolytic capacitors used in these circuits to have a low impedance characteristic.

Moreover, in the field of vehicles, with the recent tendency toward improved automobile functions, a low impedance characteristic is in high demand. By the way, the driving voltage of the vehicle circuit of 14V has been progressed to 42V accompanied by the increase in the power consumption. To comply with such a driving voltage, the electrolytic capacitor requires the withstand voltage characteristic of 28V and 84V and more. Furthermore, the electrolytic capacitors must withstand high temperature in this field, and a high temperature life characteristic is in demand.

However, the electrolytic capacitor cannot cope with the low impedance characteristic as such. Moreover, although the withstand voltage of 28V is capable, the limit is 30V, and it cannot respond to the requirement of the high withstand voltage of 84V and more. Moreover, these electrolytic capacitors suffer from a problem that the electrolyte solution would leak between the sealing member 12 and the perforation hole of the lead wire 5 for leading the cathode electrode. The electrolyte solution leakage invites the deterioration electronically such as decline in electrostatic capacity of the electrolytic capacitor resulting in the disadvantage of the short life of the electrolytic capacitors.

Henceforth, the present invention aims to provide an electrolytic capacitor excellent in the leakage characteristic, and having a low impedance characteristic and a high withstand voltage characteristic of 100V class, and an excellent high temperature life characteristic.

DISCLOSURE OF INVENTION

According to a first electrolytic capacitor comprising a capacitor element that includes an anode electrode foil and a cathode electrode foil connected respectively to an anode tab and a cathode tab, wound together with intervening separator is impregnated with electrolyte solution, an aluminum cylindrical outer case with a bottom for housing the capacitor element, and a sealing member for sealing an open end of the outer case, wherein the electrolyte solution in use contains an aluminum tetrafluoride salt, and wherein the cathode electrode foil uses a foil that shows noble electrode potential at least in the electrolyte solution than an electrode potential of the cathode tab.

As the cathode electrode foil, a foil showing noble potential than the electrode potential of the cathode tab in the electrolyte solution is provided with coating of 0.02~0.1 μm made of metal nitride selected from the group consisting of titanium nitride, zirconium nitride, tantalum nitride and niobium nitride or a metal selected from the group consisting of titanium, zirconium, tantalum and niobium formed on a surface of the aluminum foil.

BRIEF DESCRIPTION OF DRAWINGS

FIG. 2 is a decompositional oblique view showing a structure of electrolytic capacitor.

BEST MODE TO CARRYING OUT THE INVENTION

Figure 1:
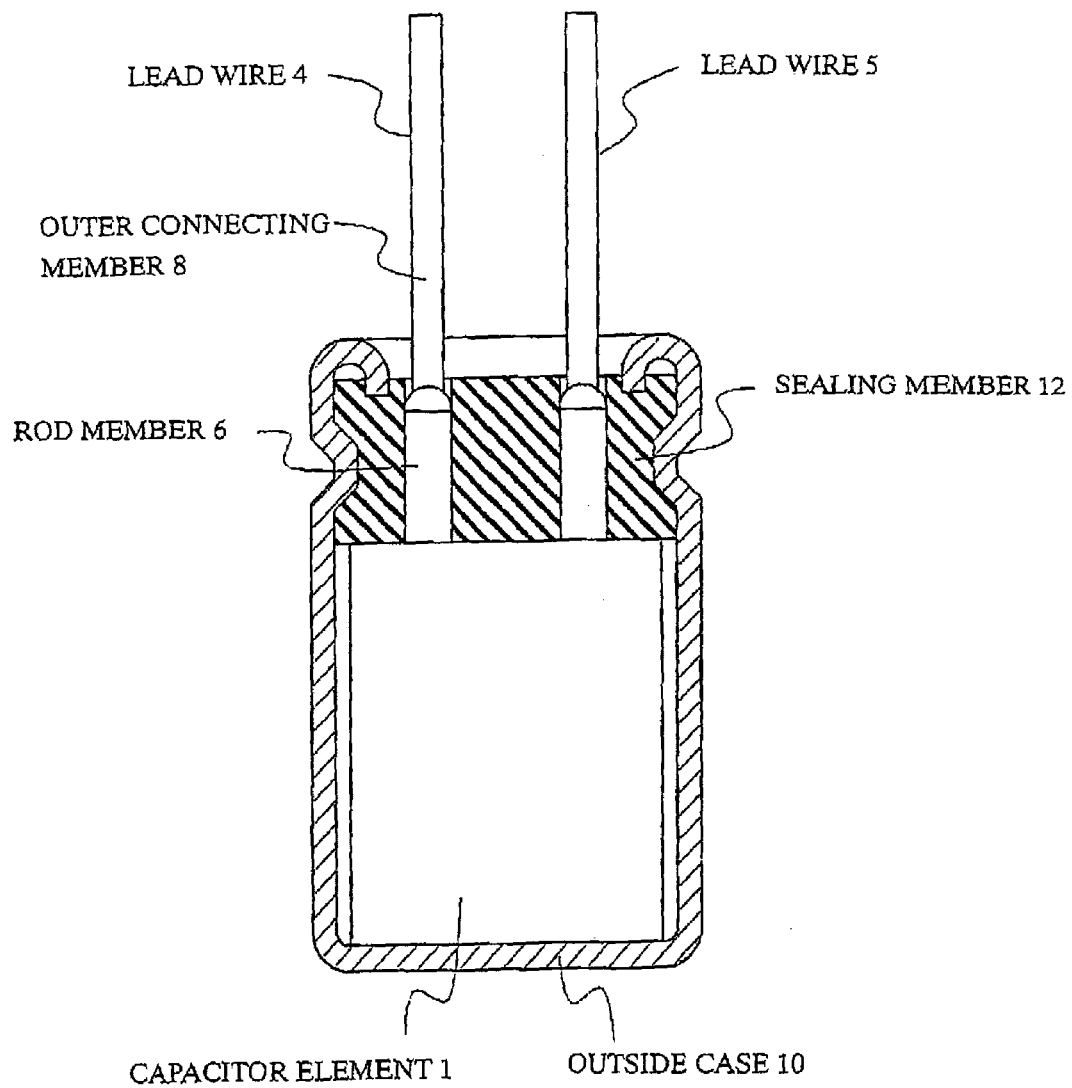
FIG. 1 is an inner cross-sectional view showing a structure of electrolytic capacitor.

Aluminum electrolytic capacitor has such a structure same as the conventional structure, as shown in FIGS. 1 and 2. Capacitor element 1 is formed by an anode electrode foil 2 and a cathode electrode foil 3, wound together with intervening separator 11. Moreover, as shown in FIG. 2, lead wires 4 and 5, employed as the electrode leading means, are connected to the anode electrode foil 2 and the cathode electrode foil 3, respectively The lead wires 4 and 5 are comprised of connecting members 7 that come into contact with both electrode foils; an electrode tab 9 composed of a rod member 6 which is connected to the connecting member 7; and an outer connecting member 8 weld to the rod member 6. Further, each foil and lead wire is mechanically connected by means of stitching, ultrasonic welding, and the like.

The anode electrode foil 2 used is one obtained in such a manner that an aluminum foil of a purity of 99% is subjected to chemical or electrochemical etching in an acidic solution to enhance the surface area thereof and then subjected to chemical treatment in an ammonium borate or ammonium adipate aqueous solution, so as to form an anode oxide film layer on the surface thereof.

The capacitor element 1 impregnating with the electrolyte solution is housed in an aluminum cylindrical outer case 10 with a bottom, and a sealing member 12, having a perforation hole for guiding the lead wires 4 and 5, is inserted into an open end of the outer case 10, and further, the open end of the outer case 10 is sealed by drawing to seal the aluminum electrolytic capacitor.

Then, in the present invention, the cathode electrode foil 3 used is an aluminum foil of a purity of 99% having been subjected to etching in the likewise manner as the anode electrode foil 2. Further, the cathode electrode foil 3 is provided with coating of 0.02~0.1 μm made of a metal nitride selected from the group consisting of titanium nitride, zirconium nitride, tantalum nitride and niobium nitride or a metal selected from the group consisting of titanium, zirconium, tantalum and niobium formed on the whole surface or a part of the cathode electrode foil 3. Further, as cathode tab, the aluminum of 99% purity is preferably used.

The electrolyte solution of the electrolytic capacitor used in the present invention contains an aluminum tetrafluoride salt.

As the aluminum tetrafluoride salt constituting the aluminum tetrafluoride as anion component, examples of this salt include an ammonium salt, an amine salt, a quaternary ammonium salt, or a quaternary cyclic amidinium ion as cation component, can be used. Examples of an amine constituting the amine salt include a primary amine (such as methylamine, ethylamine, propylamine, butylamine, ethylenediamine, monoethanolamine, and the like); secondary amine (such as dimethylamine, diethylamine, dipropylamine, ethy-methylamine, diphenylamine, diethanolamine and the like); and tertiary amine (such as trimethylamine, triethylamine, tributylamine, triethanolanmine, and the like). Examples of a quaternary ammonium constituting the quaternary ammonium salt include a tetraalkylammonium (such as tetramethylammonium, tetraethylammonium, tetrapropylammonium, tetrabutylammonium, methyltriethylammonium, di-methyldiethylammonium and the like) and a pyridinium (such as 1-methylpyridinium, 1-ethylpyridinium, 1,3-diethylpyridinium and the like).

Furthermore, as for salt containing the quaternized cyclic amidinium ion as a cationic component, the quaternized cyclic amidinium ion is a cation formed by quaternized a cyclic compound having an N,N,N'-substituted amidine group, and the following compounds are exemplified as the cyclic compound having an N,N,N'-substituted amidine group. They are an imidazole monocyclic compound (for example, an imidazole homologue, such as 1-methylimidazole, 1-phenylimidazole, 1,2-dimethyl-imidazole, 1-ethyl-2-methylimidazole, 2-ethyl-1-methylimidazole, 1,2-diethylimidazole, 1,2,4-trimethylimidazole and the like, an oxyalkyl derivative, such as 1-methyl-2-oxymethylimidazole, 1-methyl-2-oxyethyl-imidazole, and the like, a nitro derivative such as 1-methyl-4(5)-nitroimidazole, and the like, and an amino derivative such as 1,2-dimethyl-5(4)-aminoimidazole, and the like), a benzoimidazole compound (such as 1-methylbenzoimidazole, 1-methyl-2-benzylbenzoimidazole, 1-methyl-5(6)-nitrobenzo-imidazole and the like), a compound having a 2-imidazoline ring (such as 1-methylimidazoline, 1,2-dimethylimidazoline, 1,2,4-trimethylimidazoline, 1-methyl-2-phenylimidazoline, 1-ethyl-2-methylimidazoline, 1,4-dimethyl-2-ethyl-imidazoline, 1-methyl-2-ethoxymethylimidazolinc, and the like), a compound having a tetrahydropyrimidine ring (such as 1-methyl-1,4,5,6-tetrahydropyrimidine, 1,2-dimethyl-1,4,5,6-tetrahydropyrimidine, 1,8-diazabicyclo[5,4,0]undecen-7,1,5-diazabicyclo[4,3,0]-nonene-5, and the like), and the like.

The solvent in use for electrolyte solution according to the present invention comprises a polar protic solvent, a polar aprotic solvent, and their mixture thereof. Examples of the polar protic solvent include monohydric alcohols (such as ethanol, propanol, butanol, pentanol, hexanol, cyclo-butanol, cyclo-pentanol, cyclo-hexanol, benzyl alcohol, and the like); and polyhydric alcohol and oxy alcohol compounds (such as ethylene glycol, propylene glycol, glycerine, methyl cellosolve, ethyle cellosolve, methoxy propylene glycol, dimethoxy propanol, and the like), Moreover, representatives examples of the aprotic polar solvent include amide series (such as N-methylformamide, N,N-dimethylformamide, N-ethylformamide, N,N-diethylformamide, N-methyl acetamide, N,N-dimethyl acetamide, N-ethyl acetamide, N,N-diethyl acetamide, hexamethylphosphoric amide, and the like); lactone compounds (such as γ-butyrolactone, δ-valerolactone, γ-valerolactone, and the like); sulfolane series (such as sulfolane, 3-methyl sulfolane, 2,4-dimethyl sulfolane, and the like); cyclic amide compounds (such as N-methyl-2-pyrrolidone, and the like); carbonate compounds (such as ethylene carbonate, propylene carbonate, isobutylene carbonate, and the like); nitrile compound (such as acetonitrile, and the like); sulfoxide compound (such as dimethyl sulfoxide, and the like); 2-imidazolidinone solvents [for example, 1,3-dialkyl-2-imidazoridinone (such as 1,3-dimethyl-2-imidazoridinone, 1,3-diethyl-2-imidazoridinone, 1,3-di(n-propyl)-2-imidazonidinone, and the like); and 1,3,4-trialkyl-2-imidazoridinone (such as 1,3,4-trimethyl-2-imidazoridinone, and the like)], and the like. Among them, γ-butyrolactone is preferably used because the impedance characteristic improves. Sulfolane, 3-methyl sulfolane, and 2,4-dimethyl sulfolane are preferably used because the high temperature characteristic improves. Ethylene glycol is preferably used because the withstand voltage characteristic improves.

Herewith, in the electrolyte solution containing quaternized cyclic amidinium salts as the solute, and employing γ-butyrolactoneas the solvent, although the electrolytic capacitors suffer from a problem of electrolyte solution leakage from between the sealing member 12 and the rod member 6 of the lead wire during the life test. In contrast thereto, no liquid leakage is observed in the electrolytic capacitor of the present invention. Namely, in a normal electrolytic capacitor, the spontaneous immersion potential of the cathode lead wire 5 is noble as compared with the spontaneous immersion potential of the cathode electrode foil 3. When a direct current is loaded, therefore, more cathode current passes through the cathode lead wire than through the cathode electrode foil. Moreover, when left standing unloaded, a local cell is formed by the cathode lead wire and the cathode electrode foil and thus a cathode current passes through the cathode lead wire. That is to say, a cathode current passes through the cathode lead wire both in the loaded and unloaded states. As a result, hydroxyl ion is formed at electrolyte solution interface between the rod member 6 and the connecting member 7 of the cathode lead wire.

Then, the hydroxyl ion thus formed reacts with a quaternized cyclic amidinium. The quaternized cyclic amidinium undergoes ring-opening to give a secondary amine. When hydroxyl ion is formed, however, γ-butyrolactone employed as the solvent also reacts with hydroxyl ion to give γ-hydroxybutyric acid, and the pH is lowered. Due to a decline in the pH value, the secondary amine formed by the ring-opening of the quaternized cyclic amidinium undergoes ring-closure to give the quaternized cyclic amidinium salt again. Since the quaternized cyclic amidinium salt thus formed is not volatile but highly hygroscopic, there arises liquid leakage due to the hygroscopicity of the quaternized cyclic amidinium salt regenerated between the rod member and the sealing member of cathode lead wire.

However, in the present invention, as a cathode electrode foil, a foil that shows noble electrode potential at least in the electrolyte solution than the electrode potential of cathode tab is used, and as a solute the aluminum tetrafluoride salt of the quaternized cyclic amidinium compound is used. For this reason, the cathode current flows to the cathode electrode foil. Most of the hydroxyl ions are generated in the cathode electrode foil. Further, when aluminum of high purity is used in the cathode tab, a difference in the potentials of the cathode electrode foil and the cathode tab gets large, and the hydroxyl ion generation at the cathode tab gets less. Furthermore, the aluminum tetrafluoride salt of the quaternized cyclic amidinium compound seems to show a less reactivity with the hydroxyl ion. These synergistic effects prevent the leakage. The leakage is similarly prevented in the unloaded state.

According to an electrolytic capacitor of the present invention described above has a low impedance characteristic and a high withstand voltage characteristic of 100V class, wherein the electrolytic capacitor provides an excellent high temperature life characteristic and an excellent leakage characteristic.

Subsequently, the second electrolytic capacitor of the present invention will be explained. The electrolytic capacitor of the present invention is characterized in that an anode electrode foil, having anode leading means, and a cathode electrode foil, having cathode leading means made of aluminum of purity 99.9% and more subjected to chemical treatment, which are wound together with intervening separator to form a capacitor element. This capacitor element impregnates electrolyte solution containing the aluminum tetrafluoride salt, and is housed into the outer case.

Aluminum electrolytic capacitor has the same structure as the first electrolytic capacitor, however, in the present invention, the cathode electrode foil 3 is comprised of an electrode foil as cathode leading means made of aluminum of 99.9% purity, which is subjected to chemical treatment. The electrode aluminum foil of the present invention can be obtained by having been subjected to etching and then subjected to chemical treatment at 0.05 to 5V, more preferably at 0.5 to 3V. Furthermore, at least to the surfaces of the rod members 6 of the lead wires 4 and 5, aluminum oxide layers are formed by anode oxidation of ammonium borate aqueous solution, ammonium phosphate aqueous solution, or ammonium adipate aqueous solution and the like.

Herewith, a behavior of the electrolyte solution leakage is similar to the first electrolytic capacitor, however, in the present invention, an electrode foil made of aluminum of 99.9% purity subjected to chemical treatment is used as the cathode electrode foil, and the aluminum tetrafluoride salt of the quaternary cyclic amidinium compound is used as solute. For these reasons, the spontaneous immersion potential of the cathode electrode foil is noble as compared with the spontaneous immersion potential of the cathode leading means, therefore, a cathode current passes through the cathode electrode foil. Thus, hydroxyl ions are generated at the cathode electrode foil. Furthermore, at least to the surfaces of the rod members 6 of the lead wires 4 and 5, when aluminum oxide layer is formed by anode oxidation, the current passing through the cathode leading means is controlled, and the generation of hydroxyl ion near the cathode leading means is reduced. Then, the reactivity of aluminum tetrafluoride salt of the quaternary cyclic amidinium compound with the hydroxyl ion is seemingly less. Thus, these synergistic effects prevent the liquid leakage. The leakage is similarly prevented in the unloaded state.

According to an electrolytic capacitor of the present invention, having a low impedance characteristic, and a high withstand voltage characteristic of 100V class, wherein the electrolytic capacitor provides an excellent high temperature life characteristic and an excellent leakage characteristic.

Subsequently, the third electrolytic capacitor of the present invention will be described. According to the electrolytic capacitor of the present invention comprises the capacitor element fabricated by winding an anode electrode foil and a cathode electrode foil via a separator is impregnated with the electrolyte solution, an outer case for housing the capacity element, and wherein the electrolyte solution in use contains an aluminum tetrafluoride salt, and electrode foils subjected to a phosphate treatment are used as the cathode electrode foil and the anode electrode foil.

Structure of this electrolytic capacitor is similar to the first electrolytic capacitor. The electrode foil subjected to phosphate treatment is used as the electrode foils. The present invention is still effective by using the electrode foil subjected to phosphate treatment as one of the cathode electrode foil and the anode electrode foil. Deterioration of both foils is prevented if this is applied to both foils so normally both foils are subjected to phosphate treatment. Normally, the aluminum foil of high purity is subjected to chemical or electrochemical etching to obtain the etching foil, however, as the electrode foil of the present invention, the etching foil obtained by performing the phosphate aqueous solution impregnation process before, during, or after the etching process is used as the cathode electrode foil. Further, as the anode electrode foil, the etching foil, the etching foil untreated with phosphate is subjected to phosphate synthesis, or the electrode foil that performed the phosphate impregnation process before, during, or after the chemical treatment is used.

Furthermore, the effect of the present invention improves by adding the phosphorous compounds to the electrolyte solution of the electrolytic capacitor described above. Examples of phosphorus compounds and salts thereof include orthophosphoric acid, phosphonous acid, hypophosphorus acid and their salts. As the salts of the phosphorus compounds, an ammonium salt, an aluminum salt, a sodium salt, a calcium salt, and a potassium salt can be used. Moreover, examples of phosphorous compound include ethyl phosphate, diethyl phosphate, butyl phosphate, dibutyl phosphate and the like; and phosphonate such as 1-hydroxyethylidene-1,1-diphosphonic acid, aminotrimethylene phosphonic acid, phenyl phosphonic acid, and the like. Moreover, examples of phosphinate include methyl phosphinate, butyl phosphinate, and the like.

Furthermore, examples of condensed phosphates include straight-chain condensed phosphates such as pyrophosphoric acid, tripolyphosphoric acid, tetrapolyphosphoric acid, and the like; cyclic condensed phosphates such as metaphosphate, hexametaphosphate, and the like, or the combination of the chain condensed phosphate and cyclic condensed phosphate. Further, as salts of these condensates, an ammonium salt, an aluminum salt, a sodium salt, a calcium salt, a potassium salt, and the like can be used, The addition amount is ranging from 0.05 to 3% by weight, and preferably is ranging from 0.1 to 2% by weight.

The electrolytic capacitor of the present invention described above has a low impedance characteristic and a high withstand voltage of 100V class, and an excellent high temperature life characteristic. In other words, in case of performing the high temperature life test by using the aluminum tetrafluoride salt, the reactivity of the electrolyte solution with the electrode foil gets large due to the moisture inside the electrolyte solution, and the characteristics are affected. However, since the electrolytic capacitor of the present invention utilizes the electrode foil subjected to phosphate treatment, the reaction of the electrode foil with the electrolyte solution is controlled, whereby the high temperature life characteristic is stabilized.

Furthermore, as for first to third electrolytic capacitor of the present invention, a partial cross-lining peroxide butyl rubber that added peroxide as cross-lining agent to a butyl rubber polymer comprised of isobutylene, isoprene, and divinylbenzene copolymer is used as the sealing member. Examples of vulcanizing agents used in the vulcanization of peroxides include ketone peroxides, peroxy ketals, hydroperoxides, dialkyl peroxides, diacyl peroxides, peroxy dicarbonates, peroxy esters, and the like. Specific examples are 1,1-bis-t-butylperoxy-3,3,5-trimethylcyclohexane, n-butyl-4,4-bis-t-butylperoxy-valerate, dicumyl peroxide, t-butylperoxy-benzoate, di-t-butyl-peroxide, benzoyl peroxide, 1,3-bis (t-butyl peroxy-isopropyl) benzene, 2,5-dimethyl-2, 5-di-t-butylperoxyl-hexene-3, t-butyl peroxy cumene, α, α'bis (t-butylperoxy) diisopropylbenzene, and the like.

According to the electrolytic capacitor of the present invention, a partial cross-linking peroxide butyl rubber that added peroxide as cross-linking agent to a butyl rubber polymer comprised of isobutylene, isoprene, and divinylbenzene copolymer is used as the sealing member. The electrolyte solution containing the aluminum tetrafluoride salt is used. The electrolytic capacitor of the present invention has a low impedance characteristic, and a high withstand voltage characteristic of 100V class. The high temperature life characteristic is improved further by the excellent high temperature characteristics of the electrolyte solution and the sealing member of the present invention.

Moreover, the quaternary cyclic amidinium compound tends to cause leakage due to the reaction with the hydroxyl ion generated in the vicinity of the cathode leading means, however, the electrolyte solution used in the present invention seemingly has a less reactivity with the hydroxyl ion, and owing to the excellent sealability between the perforation hole of the sealing member and the lead wire, the leakage characteristic is further improved by these synergistic effects.

EMBODIMENTS

Subsequently, the present invention will be explained by using the embodiments. The electrolytic capacitor of the present invention has the same structure as that of the conventional ones. The present invention is explained by referring to FIGS. 1 and 2. A capacitor element 1 is formed by winding an anode electrode foil 2 and a cathode electrode foil 3 via a separator 11. As FIG. 2 shows, the anode electrode foil 2 and the cathode electrode foil 3 are connected respectively to a lead wire 4 for leading the anode electrode and an another lead wire 5 for leading the cathode electrode.

These lead wires 4 and 5 are composed of connecting members 7 being in contact with the electrode foils, electrode tabs 9 having been molded integrally with the connecting members 7 and the rod members 6, and outer connecting members 8 having been fixed at the tip of the rod members 6. The connecting member 7 and the rod member 6 are made from aluminum of 99% purity while the outer connecting member 8 is made of a copper-plated steel wire (hereinafter CP wire). On the surfaces of the rod members 6 of the lead wires 4 and 5 at least, anode oxide films made of aluminum oxide are formed by a chemical treatment with ammonium phosphate aqueous solution. These lead wires 4 and 5 are connected respectively to the electrode foils 2 and 3 at the connecting members 7 by means of stitching, ultrasonic welding, and the like.

The anode electrode foil 2 is made of an aluminum foil of 99.9% purity in an acidic solution thereby enlarging the surface area thereof through the chemical or electrochemical etching process, and then subjecting the aluminum foil to a chemical treatment in an ammonium adipate aqueous solution, to thereby form an anode oxidation film on the surface thereof.

The capacitor element 1, which impregnates the electrolyte solution, is then housed into a bottomed outer case 10 made of aluminum. The outer case 10 is provided at the opening with a sealing member 12 and then sealed by drawing. The sealing member 12 is made of, for example, an elastic rubber such as butyl rubber, and the like, and has perforation holes through which the lead wires 4 and 5 are to be passed.

The cathode-electrode foil 3 in use, similar to the anode electrode foil 2, is prepared by etching the aluminum foil of 99.9% purity. The whole surface of the cathode electrode foil 3 is coated with titanium or titanium nitride in 0.1 μm thickness by vacuum evaporation method. Further, in the present embodiment, the film layer such as titanium nitride and the like is coated throughout the cathode electrode foil 3, however, only a part of the cathode electrode foil 3 may be coated as required, for example, coated with metallic nitride only to a part of the cathode electrode foil 3.

Moreover, the electrolyte solution A containing 75% by weight of γ-butyrolactone as solvent and 25% by weight of 1-ethyl-2,3-dimethylimidazolinium aluminum tetrafluoride salt as solute is used. The electrolyte solution B containing 80% by weight of γ-butyrolactone as solvent and 20% by weight of 1-ethyl-2,3-dimethylimidazolinium aluminum tetrafluoride salt as solute is used. Further, for comparison, electrolyte solution C containing 75% by weight of γ-butyrolactone as solvent and 1-ethyl-2,3-dimethylimidazolinium hydrogen phthalate salt as solute is used.

The rated voltages of the electrolytic capacitors using the electrolyte solutions A and C are 16V, and that of using the electrolyte solution B is 100V. The characteristics of the electrolytic capacitors are evaluated. The test condition is 125° C. at 2,000 hours in the loaded state, and 105° C. at 2,000 hours in the unloaded state. The results are shown in (Table 1-1) to (Table 1-4).

TABLE 1-1

| Electrolyte | Cathode electrode foil | Initial Characteristic Cap (µF) | Tan δ | 125° C./ 2000 hrs loaded Δcap (%) | Tan δ | Leakage |
|---|---|---|---|---|---|---|
| Embody 1 | A | TiN evaporate | 401 | 0.028 | −12.1 | 0.043 | 0/25 |
| Embody 2 | A | Ti evaporate | 402 | 0.028 | −11.9 | 0.044 | 0/25 |
| Compare 1 | C | — | 405 | 0.046 | −10.0 | 0.142 | 7/25 |

TABLE 1-2

| Electrolyte | Cathode electrode foil | Initial Characteristic Cap (µF) | Tan δ | 105° C./ 2000 hrs loaded Δcap (%) | Tan δ | Leakage |
|---|---|---|---|---|---|---|
| Embody 1 | A | TiN evaporate | 402 | 0.028 | −5.4 | 0.034 | 0/25 |
| Embody 2 | A | Ti evaporate | 402 | 0.029 | −5.2 | 0.035 | 0/25 |
| Compare 1 | C | — | 406 | 0.046 | −4.2 | 0.052 | 6/25 |

TABLE 1-3

| Electrolyte | Cathode electrode foil | Initial Characteristic Cap (µF) | Tan δ | 125° C./ 2000 hrs loaded Δcap (%) | Tan δ | Leakage |
|---|---|---|---|---|---|---|
| Embody 3 | B | TiN evaporate | 22.9 | 0.011 | −6.5 | 0.026 | 0/25 |
| Embody 4 | B | Ti evaporate | 22.8 | 0.012 | −6.3 | 0.028 | 0/25 |

TABLE 1-4

| Electrolyte | Cathode electrode foil | Initial Characteristic Cap (µF) | Tan δ | 105° C./ 2000 hrs loaded Δcap (%) | Tan δ | Leakage |
|---|---|---|---|---|---|---|
| Embody 3 | B | TiN evaporate | 22.9 | 0.011 | −0.9 | 0.014 | 0/25 |
| Embody 4 | B | Ti evaporate | 22.7 | 0.013 | −0.8 | 0.015 | 0/25 |

As (Table 1-1) and (Table 1-2) clearly show, the electrolytic capacitor of the embodiment has excellent in high temperature life characteristics, a low dielectric loss coefficient (tan δ), and a less change in dielectric loss coefficient (tan δ) at 125° C., compared with the electrolytic capacitor of the comparative example, and is effective in preventing liquid leakage. Furthermore, (Table 1-3) and (Table 1-4) clearly show the excellent life characteristics and initial characteristics of the rated voltage 100V, to implement the 100V class electrolytic capacitor having a low impedance characteristic not found in the conventional ones.

Subsequently, the second electrolytic capacitor will be explained referring to the embodiment. This electrolytic capacitor has the same structure as that of the first electrolytic capacitor, and the contents of characteristic evaluation are also the same. An electrode foil made of aluminum subjected to etching at 2V followed by the chemical treatment is used as the cathode electrode foil 3, which provides cathode leading means made of aluminum of 99.9% purity and more. Moreover, the cathode electrode foil in which an aluminum oxide layer had been formed at least on the surfaces of the rod member 6 of the lead wires 4 and 5 by anode oxidation with the use of an ammonium phosphate aqueous solution. As comparative example, the etched aluminum foil of 99.6% purity is used, and in the likewise manner, an aluminum oxide layer had been formed at least on the surfaces of the rod member 6 of the lead wires 4 and 5 by anode oxidation with the use of an ammonium phosphate aqueous solution. The results are shown in (Table 2-1) and (Table 2-4).

TABLE 2-1

| Electrolyte | Cathode electrode foil | Initial Characteristic Cap (µF) | Tan δ | 125° C./ 2000 hrs loaded Δcap (%) | Tan δ | Leakage |
|---|---|---|---|---|---|---|
| Embody 5 | A | Chemical foil | 402 | 0.029 | −12.1 | 0.044 | 0/25 |
| Compare 2 | C | — | 408 | 0.046 | −10.0 | 0.143 | 7/25 |

TABLE 2-2

| Electrolyte | Cathode electrode foil | Initial Characteristic Cap (µF) | Tan δ | 105° C./ 2000 hrs loaded Δcap (%) | Tan δ | Leakage |
|---|---|---|---|---|---|---|
| Embody 5 | A | Chemical foil | 401 | 0.026 | −5.2 | 0.033 | 0/25 |
| Compare 2 | C | — | 407 | 0.046 | −4.2 | 0.053 | 6/25 |

TABLE 2-3

| Electrolyte | Cathode electrode foil | Initial Characteristic Cap (µF) | Tan δ | 125° C./ 2000 hrs loaded Δcap (%) | Tan δ | Leakage |
|---|---|---|---|---|---|---|
| Embody 6 | B | Chemical foil | 22.6 | 0.010 | −6.4 | 0.024 | 0/25 |

TABLE 2-4

| Electrolyte | Cathode electrode foil | Initial Characteristic Cap (µF) | Tan δ | 105° C./ 2000 hrs loaded Δcap (%) | Tan δ | Leakage |
|---|---|---|---|---|---|---|
| Embody 6 | B | Chemical foil | 22.9 | 0.011 | −0.9 | 0.012 | 0/25 |

As (Table 2-1) and (Table 2-2) clearly show, the electrolytic capacitor of this embodiment has excellent high temperature life characteristics, change in the dielectric loss coefficient (tan δ) of 125° C. is small, and the dielectric loss coefficient (tan δ) is small, compared with the electrolytic capacitor of the comparative example, and is effective in preventing the liquid leakage. Furthermore, (Table 2-3) and (Table 2-4) clearly show the excellent life characteristics and initial characteristics of the rated voltage 100V, to implement the 100V class electrolytic capacitor having the low impedance characteristic not found in the conventional ones.

Subsequently, the third electrolytic capacitor will be explained referring to the embodiment. The electrolytic capacitor of this embodiment has the same structure as that of the first electrolytic capacitor, except that in the present invention, as cathode foil, an etching foil subjected to phosphate impregnation treatment at etching process is used, and as anode foil, a chemical foil where anode chemical film is formed on this etching foil by phosphate synthesis. As comparative example, an electrode foil in use does not carry out such phosphate impregnation treatment or phosphate synthesis.

Moreover, the electrolyte solution of the electrolytic capacitor in use is shown in (Table 3-1).

According to the electrolytic capacitors which were constructed by using the electrolyte solution of above embodiments, the rated values of the aluminum electrolytic capacitors were 100WV-22 μF, and the characteristics of the electrolytic capacitor were evaluated. The test conditions are 125° C. and 500 hours in the loaded state. The results are shown in (Table 3-2).

TABLE 3-1

|  | GBL | A | B | C | Sparking Voltage (V) | Specific resistance Ωcm |
|---|---|---|---|---|---|---|
| Embody 7 | 79.8 | 20 | — | 0.2 | 205 | 40 |
| Compare 3 | 80 | — | 20 | — | 85 | 91 |

GBL: γ-butyrolactone
A: Tetraaluminate 1-ethyl-2,3-dimethyl-imidazolinium
B: Hydrogen phthalate 1-ethyl-2,3-dimethyl-imidazolinium
C: Dibutyl phosphate

TABLE 3-2

|  |  | Initial Characteristic | | 125° C./ 500 hours | |
|---|---|---|---|---|---|
|  | Electrode Foil | Cap (μF) | tan δ | Δ Cap (%) | Tan δ |
| Embody 8 | Phosphate finish | 23.1 | 0.01 | −1.3 | 0.01 |
| Compare 4 | No phosphate finish | 22.8 | 0.01 | −4.3 | 0.03 |

Cap: electrostatic capacity
tan δ: tangent of dielectric loss
Δ cap: change in electrostatic capacity As (Table 3-1) clearly shows, the sparking voltage of the electrolyte solution of the electrolytic capacitor of the embodiment is high, and the specific resistance is low, compared with that of the conventional example. Also, as can be seen from (Table 3-2), the dielectric loss coefficient (tan δ) of the electrolytic capacitor of 100 WV using this is low, and the change in electrostatic capacity is low, and the dielectric loss coefficient (tan δ) is ⅓ compared with that of the comparative example. The effectiveness of the present invention is apparent.

As for first to third electrolytic capacitors, in case of using, as the sealing member, a partial cross-linking peroxide butyl rubber that added peroxide as cross-linking agent to a butyl rubber polymer comprised of isobutylene, isoprene, and divinylbenzene copolymer. Namely, the present invention achieves an extremely remarkable effect of preventing liquid leakage.

INDUSTRIAL APPLICABILITY

According to first and second electrolytic capacitor of the present invention, the electrolyte solution containing the ammonium tetrafluoride salt is used, as a cathode electrode foil, a foil showing noble potential than the electrode potential of the cathode tab at least in the electrolyte solution or cathode leading means, composed of aluminum of 99.9% purity subjected to chemical treatment is used, such that the electrolytic capacitor having a low impedance characteristic and high withstand voltage characteristic, and excellent high temperature life characteristic and leakage characteristic are provided.

Moreover, according to the third electrolytic capacitor of the present invention, the aluminum tetrafluoride is used, and an electrode foil is subjected to phosphate treatment is used, so that the electrolytic capacitor having low impedance characteristic and high voltage characteristic and the of excellent high temperature life characteristic is supplied.

The invention claimed is:

1. An electrolytic capacitor comprising a capacitor element impregnated with an electrolyte solution, wherein the capacitor element contains a wound anode electrode foil and a wound cathode electrode foil, which are connected to an anode tab and to a cathode tab respectively, with an intervening separator, and wherein the capacitor element is housed in a cylindrical outer case with a bottom, and an open end of the outer case is sealed by a sealing member, wherein the electrolyte solution contains aluminum tetrafluoride salt, and wherein the cathode electrode foil shows greater noble electrode potential than an electrode potential of the cathode tab in said electrolyte solution.

2. An electrolytic capacitor according to claim 1, wherein the cathode electrode foil is an aluminum foil with a layer 0.02-0.1 μm thick coated on its surface, wherein the layer is made of a metal nitride or a metal, and wherein the metal nitride is selected from the group consisting of titanium nitride, zirconium nitride, tantalum nitride and niobium nitride and the metal is selected from the group consisting of titanium, zirconium, tantalum and niobium.

3. An electrolytic capacitor according to claim 2, wherein the sealing member comprises a partial cross-linking peroxide butyl rubber which is formed by adding peroxide as a cross-linking agent to a butyl rubber polymer, wherein the butyl rubber polymer comprises a copolymer of isobutylene, isoprene and divinylbenzene.

4. An electrolytic capacitor according to claim 1, wherein an anode lead wire electrically contacts the anode electrode foil and a cathode lead wire electrically contacts the cathode electrode foil, wherein the cathode means lead wire is made of aluminum of more than 99.9% of purity, and wherein the cathode electrode foil is made of aluminum subjected to a chemical treatment.

5. An electrolytic capacitor according to claim 4, wherein the sealing member comprises a partial cross-linking peroxide butyl rubber which is formed by adding peroxide as a cross-linking agent to a butyl rubber polymer, wherein the butyl rubber polymer comprises a copolymer of isobutylene, isoprene and divinylbenzene.

6. An electrolytic capacitor according to claim 1, wherein the anode electrode foil, the cathode electrode foil or both are subjected to a phosphate treatment.

7. An electrolytic capacitor according to claim 6, wherein the sealing member comprises a partial cross-linking peroxide butyl rubber which is formed by adding peroxide as a cross-linking agent to a butyl rubber polymer, wherein the butyl rubber polymer comprises a copolymer of isobutylene, isoprene and divinylbenzene.

8. An electrolytic capacitor according to claim 1, wherein the sealing member comprises a partial cross-linking peroxide butyl rubber which is formed by adding peroxide as a cross-linking agent to a butyl rubber polymer, wherein the butyl rubber polymer comprises a copolymer of isobutylene, isoprene and divinylbenzene.

9. An electrolytic capacitor according to claim 1, wherein the cathode electrode foil is coated with a layer of titanium nitride in the range of about 0.02 micrometers to about 0.1 micrometers thick and wherein the cathode tab is constructed from aluminum being at least 99% pure.

* * * * *